United States Patent [19]

Kruzynski et al.

[11] Patent Number: 5,577,411
[45] Date of Patent: Nov. 26, 1996

[54] MOLTEN METAL SENSING IN A CLOSED OPAQUE VESSEL

[75] Inventors: Mark T. Kruzynski, Derry; Mark B. Abate, Connellsville; Robert H. Keenan, Pittsburgh; Gregg E. Kruzynski, Greensburg, all of Pa.

[73] Assignee: Aluminum Company of America, Pittsburgh, Pa.

[21] Appl. No.: 253,948

[22] Filed: Jun. 3, 1994

[51] Int. Cl.$^6$ .......................... G01F 23/60; G01F 23/76; B22D 11/18
[52] U.S. Cl. .......................... 73/313; 73/319; 73/322.5
[58] Field of Search .................. 73/290 V, 313, 73/314, 319, 322

[56] References Cited

U.S. PATENT DOCUMENTS

| | | | |
|---|---|---|---|
| 3,423,673 | 1/1969 | Bailey et al. | 324/207.13 |
| 3,854,634 | 12/1974 | Hart | 73/322 X |
| 3,898,555 | 8/1975 | Tellerman | 324/207.13 |
| 4,071,818 | 1/1978 | Krisst | 324/208 |
| 4,144,559 | 3/1979 | Okumura et al. | 363/88 |
| 4,238,844 | 12/1980 | Ueda et al. | 367/117 |
| 4,498,521 | 2/1985 | Takeda et al. | 164/453 |
| 4,726,226 | 2/1988 | Tellerman | 73/292 |
| 4,839,590 | 6/1989 | Koski et al. | 324/208 |
| 4,939,457 | 7/1990 | Tellerman | 324/207.13 |
| 4,943,773 | 7/1990 | Koski et al. | 324/207.13 |
| 4,952,873 | 8/1990 | Tellerman | 324/207.13 |
| 5,136,884 | 8/1992 | Lovett | 73/313 |
| 5,253,522 | 10/1993 | Nyce et al. | 73/290 V X |
| 5,421,193 | 6/1995 | Carlin et al. | 73/49.2 |

FOREIGN PATENT DOCUMENTS 1594257 7/1981 United Kingdom.

OTHER PUBLICATIONS

MTS Systems Corporation, Research Triangle, North Carolina–Brochure entitled "Temposonics™ II Linear Displacement Transducers" (1991).

Primary Examiner—William A. Cuchlinski, Jr.
Assistant Examiner—Willie Morris Worth
Attorney, Agent, or Firm—Elroy Strickland

[57] ABSTRACT

A method and apparatus for casting molten metal in an opaque container and for determining the level of the metal within the container. This is accomplished by locating a strain sensing transducer over the container and metal, and sending a current pulse from the transducer along a wire located in the tube connected to the transducer and extending toward the vessel and molten metal. A permanent magnet is located on a stem connected to a float within the container, the float being effective to rest and float on the upper level of the molten metal within the container. A current pulse is sent along the wire from the transducer, which pulse produces a magnetic field, and which field interacts with a magnetic field of the permanent magnet. The interaction of the two fields exerts a strain on the tube, which strain is sensed by the transducer. The transducer also notes the time at which the current pulse is sent along the wire and produces and output signal indicative the time elapsed between the sending of the current pulse and the sensing of the strain on the tube. The elapsed time being proportional to the level of molten metal within the opaque container.

8 Claims, 3 Drawing Sheets

MOLTEN METAL SENSING IN A CLOSED OPAQUE VESSEL

BACKGROUND OF THE INVENTION

The present invention relates generally to the casting of molten metal, and particularly to sensing the level of molten metal in an opaque container that supplies an inert, direct chill casting process with molten metal.

When casting in an inert atmosphere, such as when casting aluminum-lithium alloys, the mold containing the molten metal for withdrawal and casting is sealed in order to contain the inert atmosphere. The interior of the mold is thus not visible from the outside, so that one might view the level of metal within the mold. It is necessary to know the amount of metal within the mold so that the casting process can take place without interruption because of insufficient metal in the mold. It is therefore necessary to use a level sensing system that can "see" the level of molten metal and provide an accurate measurement of the level.

One such sensing system employs eddy currents. However, eddy current sensing devices require close access to the molten metal since the sensing range of such devices is not large. Beyond a certain minimum range, the output of such devices becomes nonlinear and unstable. Preferably, the eddy current sensor should see no metal except that of the metal being examined, which in the case of inert, direct chill casting, which uses a completely enclosed steel outer shell, makes the eddy current sensing enterprise problematic.

Ultrasonic sensing devices have appropriate sensing ranges but are unstable and unreliable because of the adverse affects of thermal gradients on sound waves. It can be appreciated that the molten metal within a mold is extremely hot, whereas in progressing to the exterior of the mold, one encounters generally a room temperature condition.

SUMMARY OF THE INVENTION

The subject invention solves the problem of accurately determining the level of molten metal within a sealed opaque container by using a heat resistant float that rests and floats on the upper surface of the molten metal in combination with a linear air beating, and a linear displacement transducer that converts float movement to a readable electrical output. The range of such device is limited only by the mechanisms of the transducer. The air beating eliminates friction associated with float movement so that the measurement is repeatably reliable and accurate.

More particularly, the invention can employ the commercially available Temposonics LDT (linear displacement transducer) which is manufactured by MTS Systems Corporation, Research Triangle, N.C.. Such a transducer employs an elongated upper tube containing a wire that extends outwardly from the transducer. The transducer, tube and wire are mounted over the lid of a mold, with the wire and tube extending toward the lid and to a location adjacent a permanent magnet. The magnet is attached to the float by a second, lower tube or other stem means. When the vertical level of molten metal changes, the vertical position of the float changes which changes the vertical position of the permanent magnet and its magnetic field. The transducer operates to send a current pulse down the wire, which pulse provides its own magnetic field, and thus travels with the current pulse. When the current pulse and its magnetic field reach the location of the magnet, the two fields interact to strain (twist) the upper tube. The transducer senses the strain on the tube. The propagation speed of the current pulse is very consistent. The transducer notes both the time of the origin of the current pulse and the time of the strain in the tube. The difference between these two "times" is proportional to the distance between the location of the origin of the current pulse, which is the location of the transducer, and the current location of the field produced by the magnet, which is the current location of the magnet. This difference then is proportional to the current level of the molten metal within the opaque container, since the float locates the current position of the magnet.

A fluid beating is provided about the lower stem. Such a beating is provided by a housing structure having a perforated wall adjacent the stem, with a source of pressurized fluid being directed into a housing and permeating or diffusing through the perforated wall to the stem. The flow of fluid to the stem provides a fluid bearing that insures free movement of the lower stem structure and the supported magnet so that the accuracy of the level of the molten metal detected is not adversely affected by friction occurring between the lower stem and its support structure.

THE DRAWINGS

The invention will be better understood from consideration of the following detailed description and the accompanying drawings in which.

PREFERRED EMBODIMENTS

Figure 1:
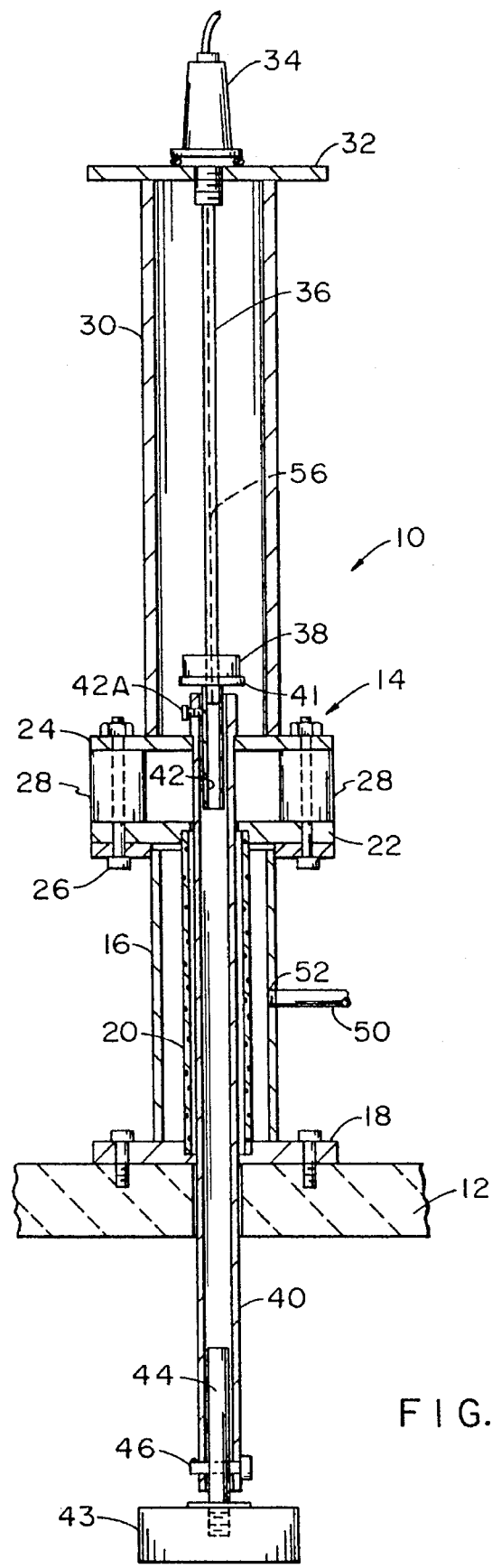
FIG. 1 is a vertical section of the sensing mechanism of the invention.

Referring now to FIG. 1 of the drawings, a system 10 is shown for accurately measuring the level of molten metal in a closed, opaque container. The container per se is not shown in the drawings though an insulating lid 12 or upper wall of the container is shown in FIG. 1. The lid or upper wall 12 conceals the level of molten metal (not shown) within the container, as well as serving to contain the metal, such that the level, and therefore the amount of metal in the container, is not visible to personnel using the container, as in the case of casting metal into solid ingot, as the metal leaves a lower portion of the container.

System 10 of the invention includes a structure 14 for supporting the elements of the system, as shown in the figures on upper wall or lid 12. More particularly, as shown in FIG. 1, support structure 14 includes a lower, hollow housing 16 that rests on lid 12 via a suitable support plate or flange 18. Housing 16 has an inner wall 20 for diffusing a gas under pressure from the housing, as discussed in detail hereinafter.

The upper portion of housing 16 terminates in a second plate or flange 22. Plate 22 is attached to a third plate 24 by bolts 26 (or other suitable fasteners), plates 22 and 24 being spaced apart by a hollow, heat resistant insulating spacers 28. Plates 22 and 24 can themselves be made of insulating materials, such materials controlling the upward movement of heat from lid 12 through support structure 14.

Support structure 14, in addition, includes an upper elongated hollow housing 30 that is suitably attached to plate 24 and an upper plate 32 that supports a linear transducer 34.

Transducer 34 is shown threaded into plate 32, and includes an elongated outer protective metal tube 36 extending downwardly to and through plate 24.

A permanent magnet 38 is located around tube 36 and secured to the upper end of an elongated lower tube 40 in the following manner. The magnet rests on and can be secured to a non-magnetic support plate 41 by small brass screws (not visible in the figures) threaded into plate 41. The plate, in turn, is attached to the upper end of tube 40 by a relatively short tube or nipple 42 that extends into tube 40. Tubes 40 and 42 can be connected together by a set screw 42A, and plate 41 can be welded to the upper end of tube 42. Further, adjustment of the position of the magnet relative to tubes 36 and 40 can be provided by a "jack screw" 42B, as shown in FIG. 2.

Tube 40 extends downwardly from the magnet to a location above the level of a body of molten metal (not shown) when the apparatus, as thus far described, is placed in position to detect the level of the body. In FIG. 1, tube 40 extends through insulated wall 12 of a container or casting mold (not otherwise shown), and through upper plates 22 and 24 and lower plate 18 in the center of support housing 16. Attached to the lower end of tube 40 is a float 43 that rests (floats) on the surface (not shown) of a body of molten metal. As shown, the float is threaded on the end of a pin 44 sized to fit into tube 40. The pin and tube are provided with aligned openings to receive a pin 46 that secures the two components together, which also secures the float to the lower end of tube 40.

The materials of float 43, tube 40, and pins 44 and 46 have a specific gravity less than that of the molten metal so that 43 can float on the metal. The materials must also, of course, be heat resistant so that they can withstand the heat of the molten environment. A suitable material for the float is Mafinite, though other materials can be used, and a suitable material for tube 40 and for pins 44 and 46 is a suitable aluminum alloy.

Figure 2:
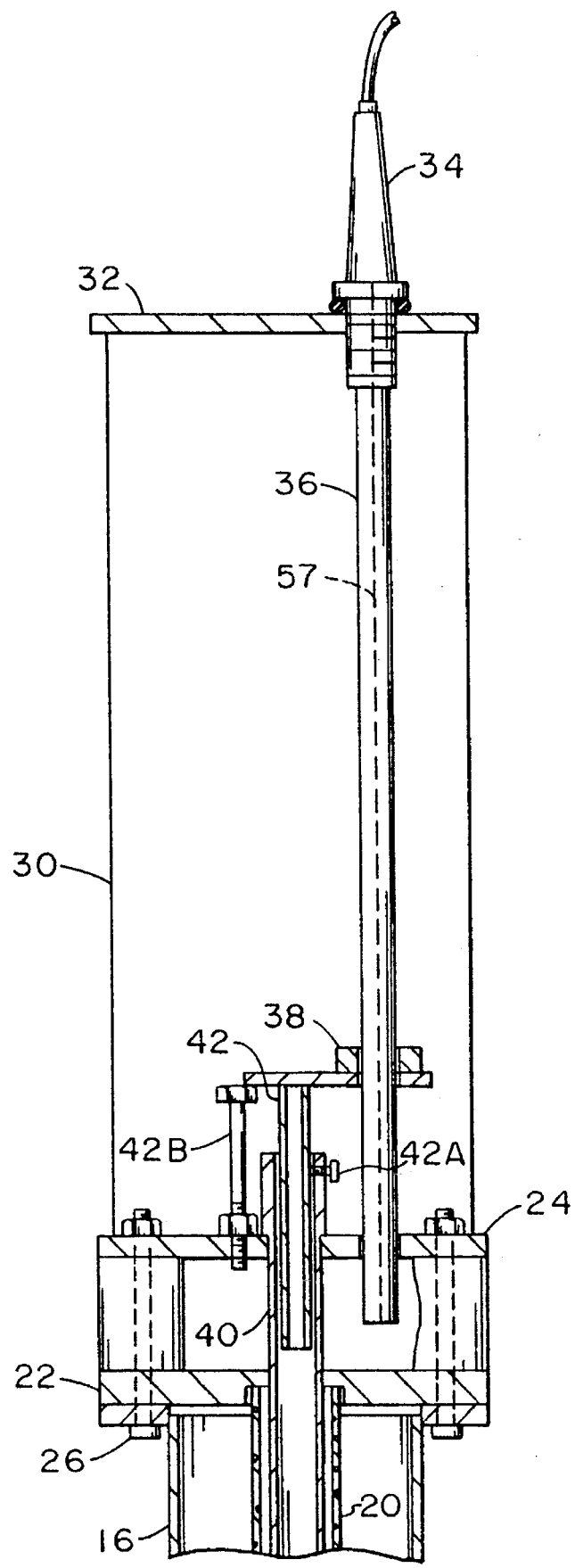
FIG. 2 is a partial sectional view of a second embodiment of the invention.

Hollow housing 16 is comprised of an outer solid wall, as shown in FIGS. 1 and 2, and the porous inner wall 20, with both walls extending the full distance between lower plate 18 and upper plate 22. The walls are, in addition, attached to said plates in a manner that seals the interior of the housing, except for the porosity of wall 20. A nipple or tube 50 is shown in FIG. 1 threaded into an opening 52 provided in outer wall 16 for conducting a gaseous medium, such as argon, under pressure to the interior of 16. Such a pressurized medium diffuses from 16 through porous wall 20 to provide a fluid bearing for tube 40. Such a bearing insures free movement of the tube and magnet 38 in a manner that assists in obtaining accurate readings of the levels of molten metal located beneath lid 12, as explained below.

Figure 3:
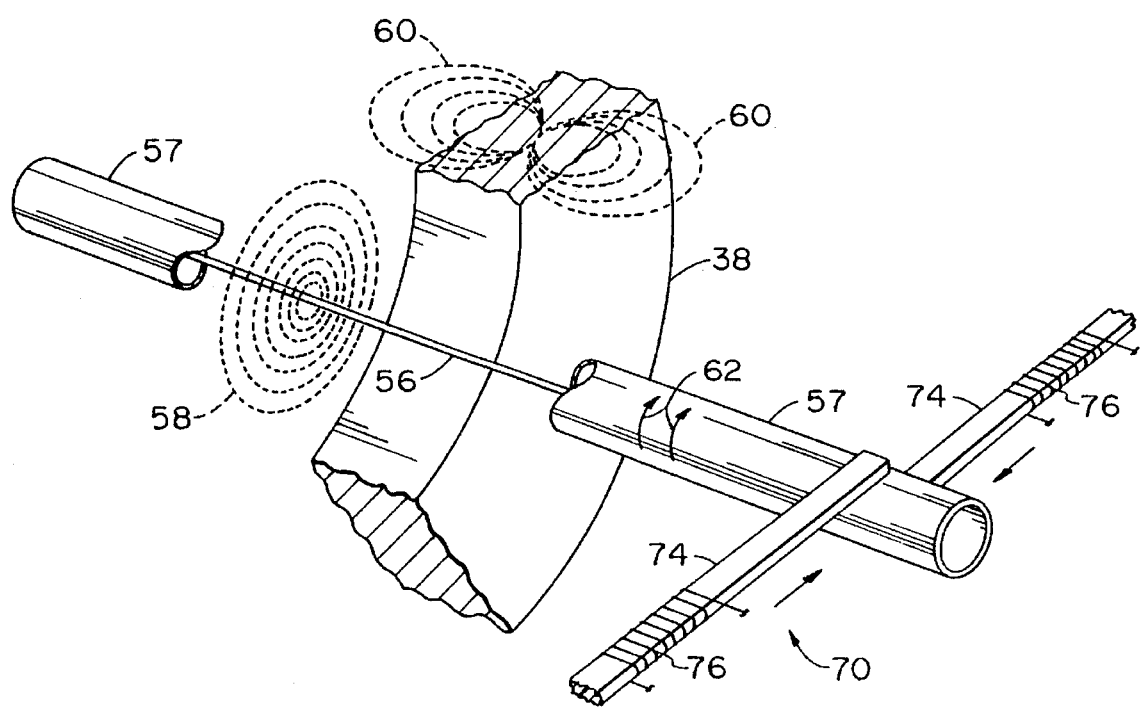
FIG. 3 is a schematic representation of a current pulse producing transducer and strain sensor employed in the invention.

Such accuracy, in combination with the fluid bearing, is provided by transducer 34 and magnet 38. More particularly, the transducer contains electronics (not shown) that sends a pulse of current through a wire 56 (visible only in FIG. 3) located in a narrow tube 57 (shown in dash outline in FIGS. 1 and 2) and extending from a current source located in the electronics of the transducer to the lower end of tube 36. (In FIG. 3, tube 57 is enlarged to better show its function, presently to be described.) Accompanying the travel of the pulse of current is a magnetic field 58, as shown in FIG. 3. This field interacts with a magnetic field 60 produced by magnet 38, as shown in FIG. 3, when the current pulse and field 58 reach the location of the magnet. The vertical location of the magnet is determined by the level of the molten metal to be sensed by system 10, as float 43 rises and falls in response to level changes. The floating movement of 43 changes the vertical position of tube 40, and thus that of the magnet, which is supported on its upper end.

When magnetic field 58 reaches the location of magnet 38, the interaction of the fields twists (strains) tube 57. Strain arrows 62 are shown in FIG. 3. The interacting fields produce interacting eddy currents in tube 57 that endeavor to twist the tube in the direction determined by the flow direction of eddy currents, the eddy currents producing a magnetic field that interact with field 60.

The materials of the tubes and support structures of system 10 are non-magnetic, such as aluminum, so that interference with the magnetic operation of the current pulse and magnet 38 is avoided. In addition, aluminum is preferred since it has a mass substantially lower than, say, stainless steel. Such a low mass allows easier, more rapid movement of tube 40 in the level sensing process, as does the fluid bearing provided by housing 16.

The sensing of the occurrence of the strain on tube 57, which is essentially instantaneous, can be effected by the mechanism depicted in FIG. 3, as generally designated by numeral 70. As shown, two strain tapes 74 made of magnetic material are suitably attached to diametrically opposite locations of tube 57 near the upper end of the tube, which extends into the transducer proper, the tapes being also located in the transducer. The tapes, respectively, extend through magnetic coils 76 that sense movement of the tapes when the tube is momentarily torqued by the interacting magnetic fields 58 and 60. The coils output a signal that indicates the occurrence of the torque (strain).

When transducer 34 sends the pulse of current through wire 56, it notes the time of the sending, and when the torque or strain on tube 36 occurs, it notes that also. The time between the two notations is dependent upon the vertical location of magnet 36, which location is dependent upon the level of the molten metal acting upon float 43. The notations provided by the transducer are highly accurate such that the sensing of the level of the molten metal is highly accurate. Thus casting, for example, can be done in a sealed opaque mold, and accurate control of metal level within such mold, by use of system 10.

For example, the transducer 34 can provide a signal output indicative of such level to operating personnel performing the casting operations, or the signal output of the transducer can be fed back to a control means, such as a solenoid operated valve, admitting and controlling the flow of molten metal to a casting mold.

FIG. 2 of the drawings shows an embodiment of the invention in which upper tube 36 is offset from the axis of lower tube 40, yet locates wire 56 and tube 57 within magnet 38 and its field. The purpose of the "offset" is to limit the conduction heat from the molten environment beneath tube 40 to transducer 34, as heat can ascend up tube 40 and up tube 36 to the transducer. The operation of the FIG. 2 embodiment is otherwise the same as that described above in connection with FIG. 1.

What is claimed is:

1. The method of sensing the level of molten metal in a container by:

locating a strain sensing transducer on a tube and over a container of molten metal, and using said transducer to send a current pulse from the transducer along a wire located in said robe and extending toward the container and molten metal, said current pulse providing a magnetic field about the wire and tube as the current pulse travels along the wire toward the container and molten metal, locating a magnet in the vicinity of said tube, said magnets providing magnetic field in said vicinity, supporting said magnet at a location above and spaced from the vessel and molten metal on a moveable stem means connected to a device that floats on the surface of the molten metal in said container and raises and lowers the stem means and magnet in accordance with changes occurring in levels of molten metal in the container, the magnetic field of the magnet and the magnetic field of the current pulse being effective to interact in a manner that strains the tube containing the wire when the magnetic field of the current pulse reaches that of the magnet, and using the transducer to notes the occurrence of said strain and the occurrence of the sending of the current pulse, and producing an output signal proportional to the difference in time between the two occurrences which is dependent upon the distance between the location of the transducer and the location of the magnet, said difference in time being proportional to the level of the molten metal in the container acting upon the stem means and magnet.

2. The method of claim 1 in which the molten metal within said container is aluminum or an aluminum alloy.

3. The method of claim 1 including supporting the transducer, tube and wire on a structure located over the container and molten metal, locating a porous wall of a chamber about said stem means, supplying said chamber with a fluid under pressure such that the fluid flows through the porous wall to and about the stem means, and using said flow of fluid to provide a fluid bearing for vertical movement of the stem means in the porous wall.

4. Apparatus for sensing the level of molten metal in a container, comprising:

an electrical, strain sensing, pulse producing and output signal producing transducer located above the molten metal and external of the container, a structure for supporting said transducer above the molten metal and container, a first tube connected to and extending downwardly from the transducer toward the molten metal, a magnet located adjacent said first tube and at a location spaced from both the transducer and molten metal, said magnet providing a magnetic field, a second, vertically moveable tube located beneath said first tube and attached to said magnet, float means connected to a lower end of said second tube for floating on the surface of the molten metal and for vertically moving the magnet, said float means being made from a heat resistant material, and a wire located in said first tube and electrically connected to the transducer, the wire, in addition, extending to a location adjacent the magnet, said transducer being capable of sending a pulse of current down the wire, which pulse creates a magnetic field that travels with the current pulse and interacts with the field of the magnet in a manner that strains the first tube, and said transducer sensing said strain and producing said output signal proportional to the time between the sending of the pulse and the sensing of the strain, said output signal varying with the level of molten metal in the container.

5. The apparatus of claim 4 in which the first and second tubes are disposed in vertical alignment over the molten metal.

6. The apparatus of claim 4 in which the first and second tubes are laterally offset from each other over the molten metal.

7. The apparatus of claim 4 including housing forming a chamber located about a portion of the second tube, said housing being connected to a source of pressurized fluid, and having an inner porous wall surrounding the second tube such that the pressurized fluid flows through the porous wall to the second tube.

8. The apparatus of claim 4 including a lid that closes the container, said supporting structure resting on said lid, and said second tube extending through an opening provided in the lid.

* * * * *